J. REINERT & J. J. McMURRAY.
AUTOMATIC EGG BOILER.
APPLICATION FILED JULY 19, 1916.

1,284,454.

Patented Nov. 12, 1918.
3 SHEETS—SHEET 1.

Witnesses

Inventors
J. Reinert and
J. J. McMurray,
By Victor J. Evans
Attorney

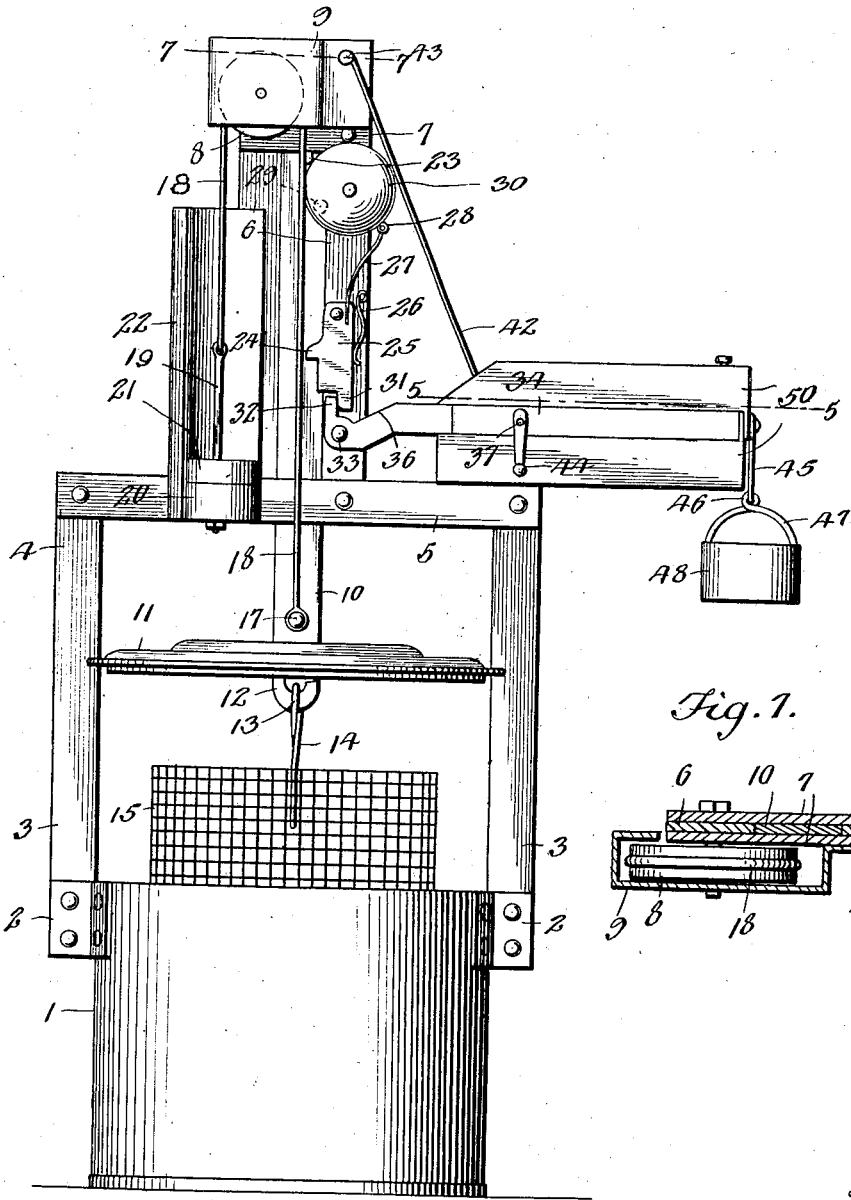

J. REINERT & J. J. McMURRAY.
AUTOMATIC EGG BOILER.
APPLICATION FILED JULY 19, 1916.
1,284,454.
Patented Nov. 12, 1918.
3 SHEETS—SHEET 3.
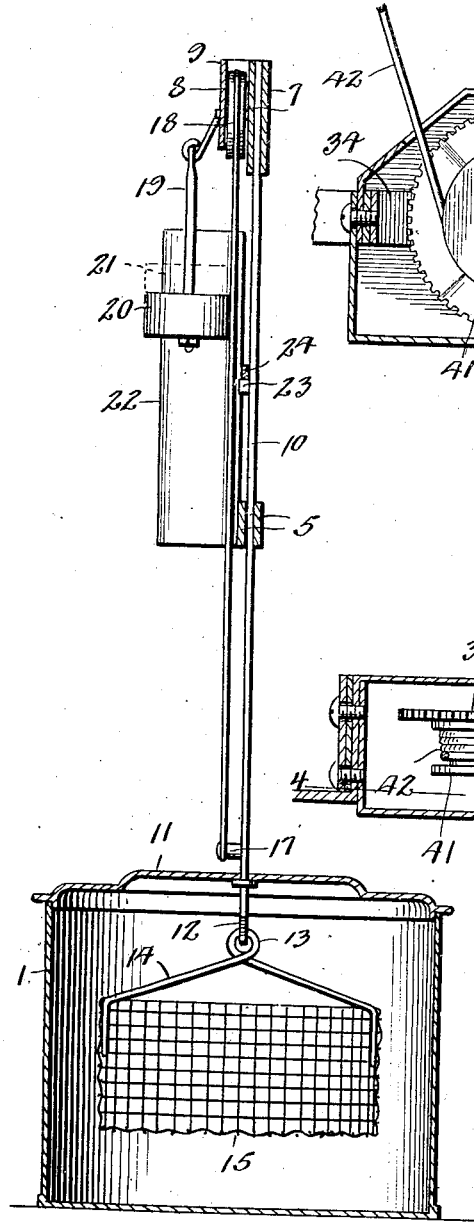
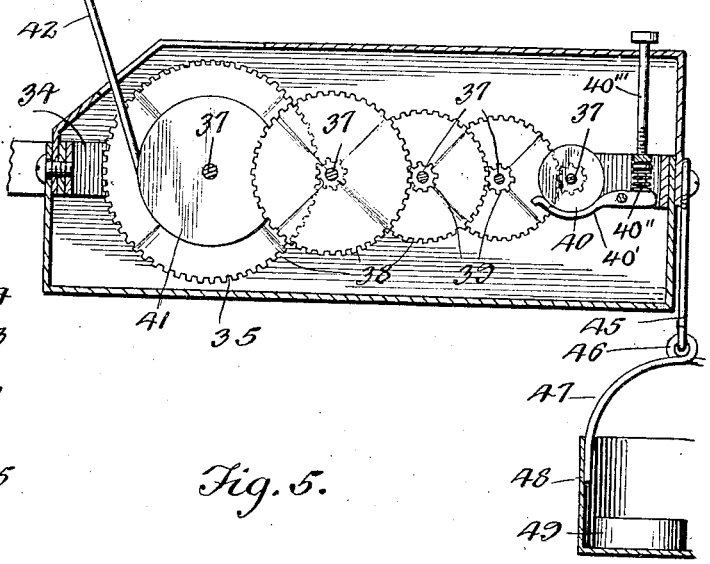
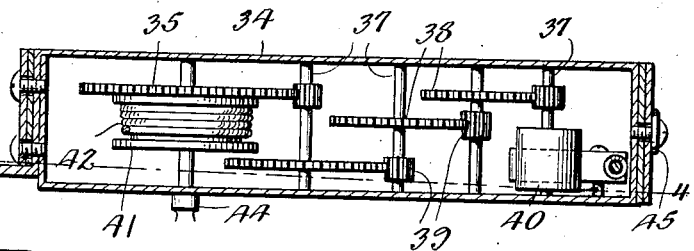
Inventors
J. Reinert and
J. J. McMurray,
By Victor J. Evans
Attorney
Witnesses

UNITED STATES PATENT OFFICE.

JOHN REINERT AND JOSEPH JENNING McMURRAY, OF MILLVALE, PENNSYLVANIA.

AUTOMATIC EGG-BOILER.

1,284,454.   Specification of Letters Patent.   Patented Nov. 12, 1918.

Application filed July 19, 1916. Serial No. 110,127.

*To all whom it may concern:*

Be it known that we, JOHN REINERT and JOSEPH J. MCMURRAY, citizens of the United States, residing at Millvale, in the county of Allegheny and State of Pennsylvania, have invented new and useful Improvements in Automatic Egg-Boilers, of which the following is a specification.

This invention relates to apparatus employed for boiling food products, such as eggs or similar articles which are materially affected if permitted to remain in the boiling water more than a predetermined time, and the primary object of the invention is to provide a device of this character which shall include a reticulated basket entering the boiling water in a suitable receptacle and to provide mechanism whereby the basket will be elevated above the water at a timed interval, and to further provide means for varying the length of time in which the said basket is to be raised.

Another object of the invention is to provide a device of this character with compensating weights whereby a basket containing food products of varying weights may be raised above the boiling water in a suitable receptacle after the release of a catch to permit of said elevation of the basket.

With these and other objects in view, the improvement resides in the construction, combination and arrangement of parts set forth in the following specification and falling within the scope of what is claimed.

In the drawings:

Fig. 2 is a similar view with the reticulated basket partially raised above the receptacle.

Fig. 3 is a vertical sectional view approximately on the line 3—3 of Fig. 1.

Fig. 4 is a sectional view approximately on the line 4—4 of Fig. 5.

Fig. 5 is a horizontal sectional view approximately on the line 5—5 of Fig. 2.

Fig. 7 is a detail enlarged sectional view approximately on the line 7—7 of Fig. 2.

Figure 1:
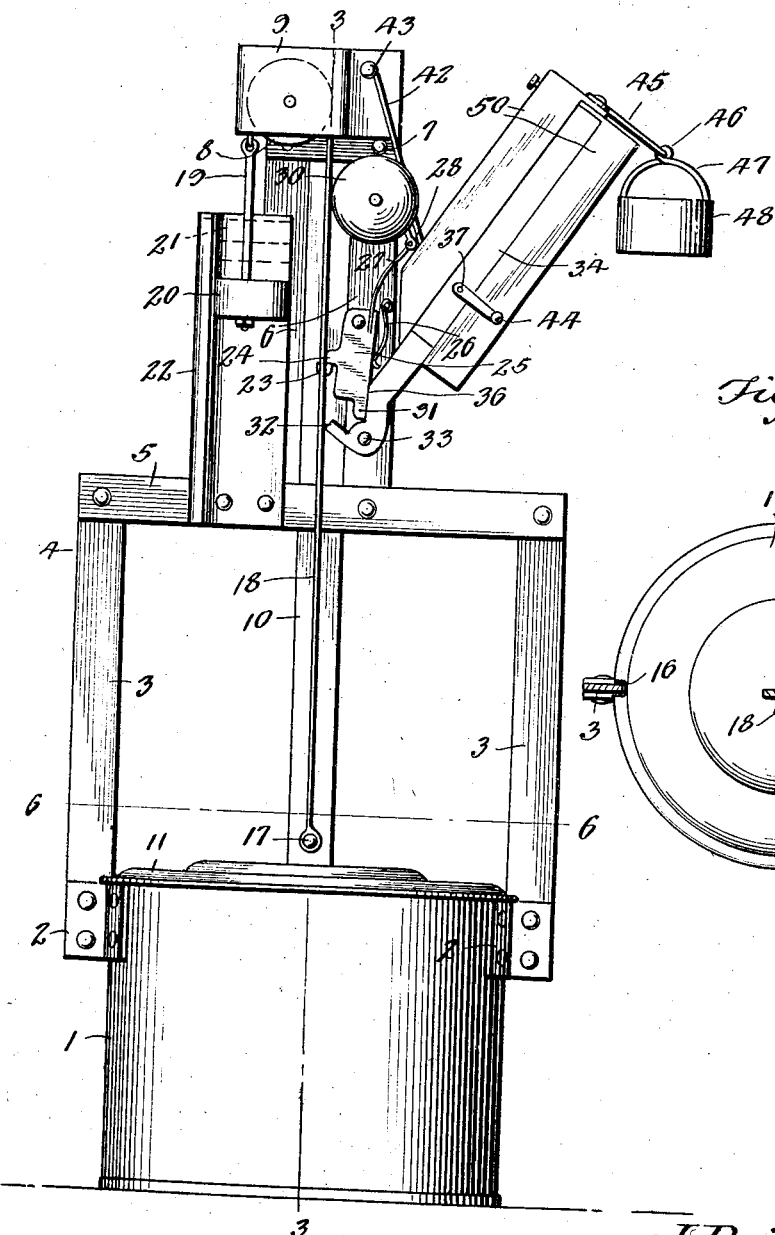
Figure 1 is a side elevation of a device constructed in accordance with the present invention.
Figure 6:
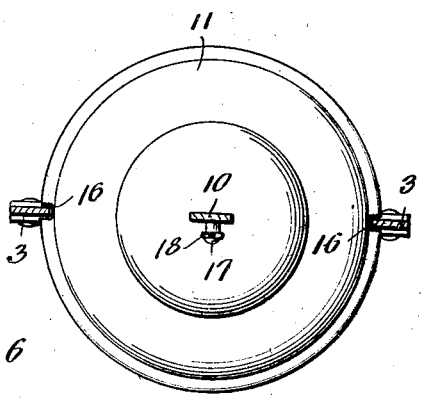
Fig. 6 is a horizontal sectional view approximately on the line 6—6 of Fig. 1.

Referring now to the drawings in detail, 1 designates a suitable vessel adapted to be placed on a stove or range to receive water which is to be boiled therein. The receptacle, adjacent the open mouth thereof and at diametrically opposite points has secured thereto bracket members 2. These brackets are preferably removable so that the improvement may be attached to any ordinary vessel or receptacle. Secured one to each of the brackets 2 are the vertically extending side members 3 of a frame 4. The side members 3 are connected at their upper ends preferably by a pair of plates 5, and secured between the said plates 5 are vertically extending guide members 6. The members 6, at the upper ends thereof have secured to their outer faces plates 7 which retain the said guide members in proper spaced relation with each other. Pivotally mounted on the outer face of one of the plates 7 is a pulley or a sheave wheel 8, and the said wheel may be, and preferably is provided with a protective casing 9.

Arranged for vertical slidable movement between the guide members 6, and passing between the connecting plates 5 of the frame 4 as well as the connecting plates 7 of the guide members 6 is a bar 10. The lower end of the bar 10 passes through an opening in the lid or cover 11 for the receptacle 1 and this portion of the bar 10 is secured to the said lid or cover. The lower end of the bar 10 is hook-shaped, as indicated by the numeral 12, and this hook is adapted to receive a central eye 13 provided in a handle or bail 14 of a reticulated or mesh basket 15. The lid 11 has its edges provided with diametrically opposite slots 16 which receive the inner edges of the side members 3 of the frame 4, and which, in addition to the guides for the bar 10, assist in directing the lid onto the mouth of the receptacle 1 and centrally arrange the basket 15 in the said receptacle. The bar 10 is provided with a lug or stud 17 to which is connected one end of a flexible member 18, the said member being trained over the sheave wheel 8, and having its free end secured in the eye provided in a rod 19 that is centrally connected with a fixed weight 20. The rod 19 is substantially rectangular in cross section, and is of a length sufficient to permit of a plurality of slotted additional weights 21 being arranged upon the said rod to rest one upon the other and upon the fixed weight 20. The fixed weight 20 is sufficiently heavy to slide the bar 10 vertically in an upward direction to raise the basket 15 out of the receptacle when eggs or other food products of a determined weight are arranged in the said basket and the weights 21 are employed when heavier products are arranged in the basket, or when the amount of ordinary products in the basket is increased.

A guide member 22 is provided for the weights. This guide preferably comprising a sheet of bendable metal which is secured, adjacent one of its edges, to one of the connecting members 5 of the frame 4 as well as to one of the vertically disposed guide members 6, the said plate being curved or rounded upon itself to conform to the peripheral contour of the weights. The open face of the guide 22 permits of the arrangement of the weights 21 upon the rod 19 and the fixed weight 20 or the removal of said weights from the fixed weight, as will be readily understood.

The slidable bar 10 is provided with a lug 23 which is adapted to be engaged by the finger 24 of a catch member 25 which is pivoted at one of its ends to one of the guide members 6. The catch is normally swung to bring its finger in a position to engage with the lug 23 by a spring 26. Connected with the catch 25 is a spring arm 27 having a head or tapper member 28 designed to contact with the bell 30 when the catch is swung to a position to release the lug on the vertical slide 10, in a manner which will presently be fully understood.

The catch member 25 is provided upon its lower edge with an extension or tail 31 which is arranged in contacting position with a trigger member 32 that is pivotally secured to one of the guide members 6, as at 33. The trigger is secured to and may provide an extension of the substantially rectangular frame 34 of a retarding device 35. The engaging finger of the trigger is arranged at one end thereof, and the body of the trigger is formed with an angular portion 36 which is adapted to engage with the outer edge of the catch member 25 to assist the spring 26 in holding the catch member in lug engaging position when the parts are in the position illustrated in Fig. 1 of the drawings. The finger 24 has its upper edge curved, so that when the same is contacted by the lug 23, when the basket is moved in a downward direction to enter the receptacle 1, the said lug will force the catch in an outward direction and not interfere with the downward sliding movement of the bar 10, when the trigger is in the position illustrated in Fig. 2 of the drawings. The rectangular frame 34 connected with the trigger 32 outward of the pivot 33 will, through the medium of the weight of the said frame, normally swing the same downward, but the frame 34 may not be sufficiently weighted to cause the trigger to swing the catch 25 against the pressure or tension of the spring 26 and therefore, I employ accelerating means for accomplishing this purpose. Such means, however, would, under ordinary conditions, result in retaining the frame 34 in a lowered position and the trigger 32 in constant engagement with the extension or tail piece 31 of the catch 25, so that the finger 24 of the said catch would be held out of the path of engagement with the lug 23 of the vertically slidable member 10. It is, therefore, necessary that retarding means be provided for resisting the influence by gravity of the frame 34 and the accelerator, such means, as clearly illustrated in Figs. 4 and 5 of the drawings, constituting a clock train. Between the sides of the frame 34 is journaled a plurality of spaced shafts 37 and secured on the inner shaft, or the shaft nearest the trigger is a comparatively large toothed wheel 35, while upon the remaining shafts are secured similar toothed wheels 38 which gradually decrease in size from the inner to the outer shaft all of the said toothed wheels meshing with pinions 39 secured on the respective shafts. On the outer shaft 37 is also secured a drum 40 which is contacted by a brake shoe 40', the same comprising a pivoted member normally influenced by a spring 40'' and the tension of this spring is regulated by an adjustable rod 40''', and these elements constitute a brake for the clock train. Secured to one of the faces of the toothed wheel 35, or on the shaft carrying the said toothed wheel is a drum 41 around which is wound a flexible element 42, the outer end of the said element being secured to a suitable hook or stud 43 arranged on one of the plates 7 or on the casing 9. The shaft 37 carrying the toothed wheel 35 and drum 41 has one of its ends extending through one of the side members of the frame 34 and to this end is secured a handle 44, whereby the flexible element or cable 42 may be wound around the drum, after the same has been partly wound therefrom by the downward swinging of the frame, through the medium of the accelerator which will presently be described. The arrangement of the clock train and the cable associated therewith, by the proper adjustment of the brake mechanism, will normally hold the frame 34 against downward swinging, so upon winding the drum 41 and the cable thereon, the frame and the retarding mechanism associated therewith may be retained at a desired angle with respect to the remainder of the structure, as for instance, in the position illustrated in Fig. 1, and by reference to the said Fig. 1, it will be noted that the trigger 32 is retained a considerable distance away from the bell or extension 31 of the pivoted catch 25, so that the frame 34 and the retarding means associated therewith must be swung, in a downward direction, a considerable distance before the trigger 32 contacts with the tail piece 31 and still further, before the catch 25 is swung sufficiently against the pressure of its spring 26 to bring the finger 24 out of engagement with the lug 23 of the vertically slidable member 10.

The clock train is inclosed by a suitable casing, preferably comprising two sections 50—50 which are removably connected, in any desired manner, to the ends and if necessary to the side members of the frame. The upper section 50 is, of course, provided with a slot or opening through which the cable or flexible element 42 passes.

The accelerating means for the retarding means comprises a bucket 48, the bail 47 thereof being centrally formed with an eye 46, a rod 47 being secured in the said eye and being connected to the outer end of the casing 50. The bucket 48 is designed to receive different sizes of weighted members 49 in accordance with the varying lengths of time desired.

Having thus described the invention, what we claim is:

1. In a device for boiling eggs or the like, the combination with a hot water receptacle, a frame thereabove, a weight supported slide on said frame, a reticulated basket carried by the slide, and a lug on said slide; of a spring pressed catch for engaging the lug to hold the slide against the influence of the weight, a gravity actuated pivoted trigger for operating the catch to release the slide when the trigger is swung to one position, retarding means connected with the trigger and with the frame to regulate the swinging of the trigger by gravity, and accelerating means for said trigger to influence the same against the action of said retarding means.

2. In a device for boiling eggs or the like, the combination with a hot water receptacle, a frame thereabove, a weight supported slide on said frame, a reticulated basket carried by the slide, and a lug on the slide; of a spring pressed catch for engaging the lug to hold the slide in one position against the influence of the weight, a pivoted gravity actuated trigger for operating the catch to release the slide when the trigger is swung to one position, retarding means connected with the trigger and pivotally connected with the frame, said means including a drum, a flexible element wound therearound and having one of its ends secured to the frame, brake means for regulating the unwinding of the flexible element from the drum, and regulating means for said brake means.

3. In a device for boiling eggs or the like, the combination with a hot water receptacle, a frame thereabove, a weight supported slide on said frame vertically movable therein, a basket carried by the slide, a lug on the slide, of a spring pressed catch for engaging the lug to hold the slide against the influence of the weight, a gravity actuated pivoted trigger for operating the catch to release the slide when the trigger is swung to one position, a frame connected to the trigger, a brake drum therein, braking means therefor, a train of gear wheels journaled in the frame and controlled by the brake drum, regulating means for the brake means, a second drum connected with one of the gear wheels, a flexible element wound therearound and connected to the first mentioned frame, a handle on the shaft of the last mentioned drum, and accelerating means connected to the outer end of the trigger frame designed to influence the trigger against the action of the retarding means.

4. In a device for boiling eggs or the like, the combination with a hot water receptacle, a frame thereabove, a weight supported slide movable in said frame, a basket carried by said slide, and a lug on the slide; of a catch for engaging the lug to hold the slide in one position against the influence of the weight, a pivoted gravity actuated trigger for moving the catch to release the slide when the trigger is swung to one position, a frame rigidly secured to the trigger, a train of gears in said frame, brake means therefor, regulating means for said brake means, a drum on the shaft of one of the gear wheels, a flexible element having one of its ends secured to the drum and wound around the said drum and having its other end connected to the mentioned frame above the receptacle, a handle on the shaft of the drum, accelerating means connected to the outer end of the pivoted frame, said accelerating means comprising a bucket having weights arranged therein.

In testimony whereof we affix our signatures in presence of two witnesses.

JOHN REINERT.
JOSEPH JENNING McMURRAY.

Witnesses:
MATT J. JONES,
CHARLES WHALLIN.